US009988318B2

(12) United States Patent
Schrader et al.

(10) Patent No.: US 9,988,318 B2
(45) Date of Patent: Jun. 5, 2018

(54) BIODEGRADABLE FERTILIZER

(71) Applicant: IOWA STATE UNIVERSITY RESEARCH FOUNDATION, INC., Ames, IA (US)

(72) Inventors: James Schrader, Boone, IA (US); William Graves, Jr., Ames, IA (US); David Grewell, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 273 days.

(21) Appl. No.: 14/880,742

(22) Filed: Oct. 12, 2015

(65) Prior Publication Data

US 2016/0102024 A1 Apr. 14, 2016

Related U.S. Application Data

(60) Provisional application No. 62/062,626, filed on Oct. 10, 2014, provisional application No. 62/066,259, filed on Oct. 20, 2014.

(51) Int. Cl.
| | |
|---|---|
| *C05F 11/00* | (2006.01) |
| *C05G 3/00* | (2006.01) |
| *C05G 3/04* | (2006.01) |
| *C05B 17/00* | (2006.01) |

(52) U.S. Cl.
CPC .............. *C05B 17/00* (2013.01); *C05F 11/00* (2013.01); *C05G 3/00* (2013.01); *C05G 3/04* (2013.01)

(58) Field of Classification Search
None
See application file for complete search history.

(56) References Cited

U.S. PATENT DOCUMENTS

| | | | |
|---|---|---|---|
| 8,317,891 B1 | 11/2012 | Cheiky et al. | |
| 8,317,892 B1 | 11/2012 | Cheiky et al. | |
| 8,361,186 B1 | 1/2013 | Shearer et al. | |
| 8,747,797 B2 | 6/2014 | Shearer et al. | |
| 8,772,559 B2 | 7/2014 | Smaidris | |
| 9,115,307 B2* | 8/2015 | Birthisel | C09K 17/42 |
| 9,850,179 B2* | 12/2017 | Uliveto | C05G 3/0058 |
| 2008/0113064 A1* | 5/2008 | Bevans | C05G 3/0041 426/2 |
| 2011/0247378 A1* | 10/2011 | Begley | C05G 1/00 71/8 |

(Continued)

FOREIGN PATENT DOCUMENTS

| | | | |
|---|---|---|---|
| CN | 101423443 | * | 5/2009 |
| CN | 101913942 | * | 12/2010 |

(Continued)

OTHER PUBLICATIONS

Schrader, James, "Greening the Green Industry With Bioplastics", Department of Horticulture, Iowa State University, 35 pages. 2012.

*Primary Examiner* — Wayne Langel
(74) *Attorney, Agent, or Firm* — McKee, Voorhees & Sease, PLC

(57) ABSTRACT

This invention relates to bio-renewable fertilizer compositions and methods of making and using the bio-renewable fertilizer compositions. In particular, the fertilizer compositions include biodegradable nutrient carriers, which have naturally derived, bio-renewable nitrogen content. The fertilizer compositions also contain biodegradable stabilizer.

15 Claims, 2 Drawing Sheets

(a)     (b)     (c)     (d)     (e)

(56) References Cited

U.S. PATENT DOCUMENTS

| | | |
|---|---|---|
| 2012/0237994 A1 | 9/2012 | Das et al. |
| 2013/0213101 A1 | 8/2013 | Shearer et al. |
| 2013/0232869 A1 | 9/2013 | Yu et al. |
| 2013/0299332 A1 | 11/2013 | Smaidris |
| 2013/0305795 A1* | 11/2013 | Pursell ................. C05G 3/0029 71/23 |
| 2014/0235438 A1* | 8/2014 | Thompson ............... C05D 3/02 504/100 |
| 2014/0290319 A1* | 10/2014 | Poo Palam ............. C05F 11/00 71/23 |
| 2017/0166488 A1* | 6/2017 | Chaudhry ............... C05B 15/00 |
| 2017/0360032 A1* | 12/2017 | Norton ..................... C05G 3/02 |
| 2017/0362138 A1* | 12/2017 | Uliveto ............... C05G 3/0088 |

FOREIGN PATENT DOCUMENTS

| | | | |
|---|---|---|---|
| CN | 104447138 | * | 3/2015 |
| WO | 2011019671 A1 | | 2/2011 |

* cited by examiner (a) (b) (c) (d) (e)

(a) (b) (c) (d) (e)

(a)          (b)          (c)          (d)

BIODEGRADABLE FERTILIZER

CROSS-REFERENCE TO RELATED APPLICATIONS

This application is related to and claims priority benefits from U.S. provisional patent application Ser. No. 62/062,626 filed on Oct. 10, 2014, and from U.S. provisional patent application Ser. No. 62/066,259 filed on Oct. 20, 2014.

STATEMENT AS TO FEDERALLY SPONSORED RESEARCH

This invention was made with government support under Grant number 2011-51181-30735 awarded by USDA/NIFA. The Government has certain rights in this invention.

TECHNICAL FIELD

This invention relates to bio-renewable fertilizer compositions and methods of making and using the bio-renewable fertilizer compositions. In particular, the fertilizer compositions include biodegradable nutrient carriers.

BACKGROUND OF THE INVENTION

An important component in fertilizers is nitrogen. Nitrogen can be obtained from natural sources or synthetic sources. The most common natural nitrogen source for fertilizers is manure. This is disfavored for a number of reasons including for example sanitary and aesthetic reasons and difficulties related to obtaining and transporting sufficient volumes of plant-available nitrogen. There are some other natural sources, including, for example fish emulsion; however, these sources are not capable of scaling up sufficiently for commercial applications. As a result, synthetic fertilizers containing synthetic nitrogen are more common. The most common production method for synthetic nitrogen for fertilizer is the Haber-Bosch reaction. Unfortunately, the Haber-Bosh reaction takes a significant amount of energy and thus is disfavored for environmental reasons.

Thus, synthetic fertilizers are becoming disfavored from an environmental perspective. It is desirable to replace synthetic fertilizers for sustainability reasons. In particular, significant energy is consumed to produce synthetic fertilizers, which could be reduced. Furthermore, there is desire to replace some synthetic materials included in synthetic fertilizer with naturally produced bio-renewable ingredients.

Accordingly, it is an objective of the claimed invention to provide nitrogen for fertilizer that comes from a natural source.

A further objective of the claimed invention is to provide a natural based fertilizer that is both biodegradable and is produced by using environmentally sustainable energy.

Yet another object of the invention is to provide an alternative to the current sources of nitrogen and fertilizer.

Other objects, advantages, and features of the present invention will become apparent from the following specification taken in conjunction with the accompanying figures.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

SUMMARY OF THE INVENTION

The present invention provides fertilizer compositions containing naturally derived, bio-renewable nitrogen content, methods of preparing the compositions, and methods of using the compositions. The fertilizer compositions contain a nutrient carrier and a biodegradable stabilizer. Preferably, the nutrient carrier is between about 30 wt. % and about 95 wt. % of the fertilizer composition and the biodegradable stabilizer is between about 10 wt. % and about 65 wt. % of the fertilizer composition. Preferably the fertilizer has at least 3 wt. % nitrogen content.

DETAILED DESCRIPTION OF THE INVENTION

Figure 1:
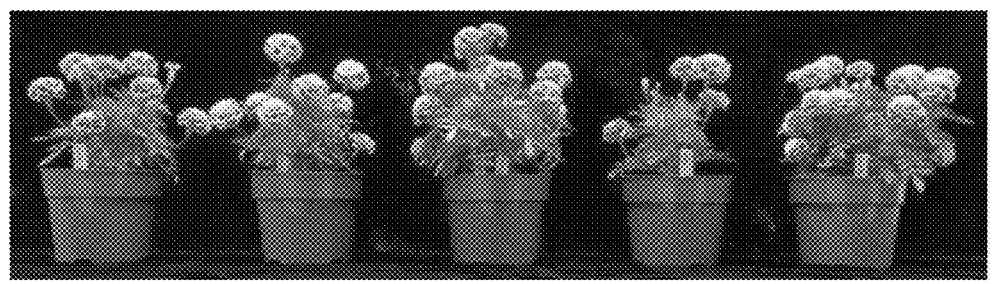
FIG. 1 shows photographs of marigolds in six-inch pots after being fertilized and/or watered. All of the marigolds were watered. The marigolds in (a) through (c) were fertilized with an exemplary fertilizer of the invention containing a soy-based polymer, PLA, and biochar. Four grams of the fertilizer were added to the pot in (a); eight grams of the fertilizer were added to the pot in (b), and sixteen grams of fertilizer were added to the marigold pot in (c). The pot in (d) was only watered and no fertilizer was added. A commercially available synthetic fertilizer was used in pot (e).

The embodiments of this invention are not limited to particular types of soil, or methods of applying fertilizer compositions to soil, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "controlled release," as used herein, refers to fertilizer compositions that release their nutrients over a period of time. The term is synonymous with "slow-release" and "timed-release."

The term "substantially free," as used herein, refers to compositions completely lacking the component or having such a small amount of the component that the component does not affect the performance of the composition. The component may be present as an impurity or as a contaminant and shall be less than 1.0 wt. %. In another embodiment, the amount of the component is less than 0.5 wt. % and in yet another embodiment, the amount of component is less than 0.1 wt. %.

The term "surface," as used herein, refers to any medium where a plant can grow, including, but not limited to, soil, soilless plant growing medium, or any medium where a plant may be grown, such as lawns, flower beds, gardens, or containerized substrates, in any desired manner.

The term "synthetic materials," as used herein, refers to compounds that contain fossil-based carbon.

The term "weight percent," "wt. %," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," et cetera.

Biorenewable Nutrient Carrier

The compositions contain a biorenewable nutrient carrier. Many bio-based nutrient carriers can be used in the compositions. Particularly suitable nutrient carriers have a nitrogen content between 3 wt. % and about 20 wt. %, preferably between 6 wt. % and 12 wt. %, and more preferably between 7 wt. % and 10 wt. %. In a preferred embodiment the nutrient carrier comprises a bioplastic, biocomposite, and/or algae.

Particularly suitable nutrient carriers include algae, carbohydrates, such as starches, fats, oils, and polysaccharides; distillers grains, including both wet distillers grains and dried distillers grains with solubles; soy-based carriers such as soy flour (SF), soy polymer (SP), soy polymer with adipic anhydride plasticizer (SPA), or soy protein; proteins, such as casein, zein S11, zein S12, and other proteins; fibers, such as paper fiber, coir fiber, peat fiber, and wood fiber; clay; biopolymers such as lignins and cellulose; stover, including, but not limited to, stover from corn, sorghum, and soybeans; and other suitable organic nutrient carriers.

In a preferred embodiment, the nutrient carrier is a soy-based polymer comprising soy protein. The soy acts as environmentally friendly fertilizer without the addition of synthetic fertilizers—it provides natural nitrogen. The replacement of synthetic fertilizer with the developed soy-based formulations provides a substantial improvement in sustainability with regard to reduced energy consumption during fertilizer production and by the replacement of synthetic material with naturally produced biorenewable ingredients.

In a preferred embodiment the compositions contain both a soy-based polymer and algae. A preferable source of algae is algae grown on waste water. Algae can provide a good natural source of phosphorous, which can benefit some fertilizer compositions.

The fertilizer compositions preferably contain between about 30 wt. % and about 95 wt. % nutrient carrier, more preferably between about 35 wt. % and about 90 wt. %, and most preferably between about 40 wt. % and about 85 wt. %.

Biodegradable Stabilizer

In some embodiments, the fertilizer composition comprises a biodegradable high-carbon polymer as a stabilizer. The biodegradable stabilizer can be petroleum-based in some embodiments. Although, in a preferred embodiment, the stabilizer is not petroleum based. Suitable biodegradable high-carbon polymers include waxes, adipic anhydride, polylactic acid (PLA), polyhydroxyalkanoate (PHA), polyurethane (PUR), polyethylene glycol (PEG), and polyamide (PAM). Other bio-based, biodegradable high-carbon polymers may also be used. In preferred embodiments, PAM is preferably derived from pine oil and PUR is preferably derived from castor oil. In some embodiments of the invention, the high-carbon polymers can be used as a coating in addition to the more common method of blending with all ingredients.

When a stabilizer is part of the fertilizer compositions, the fertilizer preferably contains between about 10 wt. % and about 65 wt. % biodegradable stabilizer, more preferably between about 15 wt. % and about 50 wt. %, and most preferably between about 20 wt. % and about 45 wt. %.

Additional Ingredients

The components of the fertilizer compositions can further be combined with various additional ingredients suitable for fertilizer compositions. Particularly suitable additional ingredients benefit the soil condition and plants grown in the soil. The additional ingredients can be added to provide certain functional benefits to the soil and/or plants. In some embodiments, the nutrient carrier and biodegradable stabilizer make up a large amount, or even substantially all, of the total weight of the fertilizer composition. For example, in some embodiments few or no additional functional ingredients are added to the fertilizer composition.

In other embodiments, additional functional ingredients may be included in the fertilizer compositions. The functional ingredients provide desired properties and functionalities to the compositions. For the purpose of this application, the term "functional ingredient" includes a material that when added provides a beneficial property in a particular use. Some particular examples of functional materials are discussed in more detail below, although the particular materials discussed are given by way of example only. A number of other additional ingredients may be added to the fertilizer compositions without departing from the invention.

Additional Fertilizers

The fertilizer compositions can optionally include an additional fertilizer. Any commercially available fertilizers can be added to the compositions. Additional fertilizers can be selected depending on the target soil.

The fertilizer compositions can preferably contain between about 0 wt. % and about 99 wt. % additional fertilizer, more preferably between about 0.5 wt. % and about 75 wt. %, most preferably between about 1 wt. % and about 50 wt. %.

Additional Nutrients

The fertilizer compositions can optionally include additional nutrients. Suitable nutrients include, but are not limited to, macronutrients containing nitrogen, phosphorus, potassium, calcium, magnesium, and sulfur, and micronutrients containing molybdenum, zinc, boron, cobalt, copper, iron, manganese and chloride. Different nutrients can be used, depending on the target soil.

The fertilizer compositions can contain between about 0 wt. % and about 50 wt. % additional nutrients, preferably between about 0.1 wt. % and about 40 wt. %; more preferably between about 0.5 wt. % and about 30 wt. %; and most preferably between about 1 wt. % and about 20 wt. %.

Biochar

In some embodiments, the fertilizer can contain biochar. Biochar can assist in conditioning the soil, i.e., improving the organic matter. Biochar is a co-product from the pyrolysis of biomass. One common source of biochar is from the production of biofuels and fundamental chemical from biomass. It primarily consists of carbon and typically has a consistency of a fine powder. The fineness of the powder makes it difficult to spread because of ease of being driven by even slight wind conditions. However, by combining it with the biorenewable nutrient carrier, the biochar can be more readily applied to soil.

Biochar may be obtained from many biomass sources. Exemplary methods of obtaining and preparing biochar can be found in U.S. Pat. Nos. 8,317,891 and 8,317,892 assigned to Cool Planet Biofuels, Inc. and U.S. Publication No. 2013/0232869 assigned to Mississippi State University.

The fertilizer compositions can contain between about 0 wt. % and about 20 wt. % biochar, preferably between about 0.5 wt. % and about 15 wt. %; more preferably between about 1 wt. % and about 10 wt. %; and most preferably between about 2 wt. % and about 8 wt. %.

Microorganisms

The fertilizer compositions can optionally include microorganisms. In other embodiments, the compositions can be substantially free of microorganisms. Often fertilizers containing microorganisms are referred to as biofertilizers. Suitable microorganisms include, but are not limited to, fungi, archaea and bacteria. Microorganisms can be beneficial as they can supply nutrients to plants symbiotically. Different compositions of fungi, archaea and bacteria may be used, depending on the target soil.

A particularly beneficial fungi is the arbuscular mycorrhizal fungi, which expresses the glycoprotein glomalin on their hyphae and spores. These fungi are members of the phyla Glomeromycota. This protein helps to bind soil particles together and is responsible for good soil tilth. When introduced into biochar, the fungi will express glomalin within the biochar pores and aid in maintaining good soil structure by binding the biochar to soil particles. Additionally, the root structure provided by the hyphae allows nutrients to penetrate in and out of the high surface area environment provided by the biochar.

The fertilizer compositions can contain between about 0 wt. % and about 50 wt. % microorganisms, preferably between about 0.1 wt. % and about 40 wt. %; more preferably between about 0.5 wt. % and about 35 wt. %; and most preferably between about 1 wt. % and about 30 wt. %.

pH Adjusters

It has been long been recognized that soil pH is an important variable in maintaining soil health and productivity. Soil pH tends to modify the bioavailability of plant nutrients. Some soils are inherently acidic or basic in nature and a soil amendment needs to consider its effect on soil acidity. Biochar can differ in its effect on soil pH depending on the biomass source of the biochar. By way of example, the decomposition of corn cobs leaves significant amounts of $K_2O$ in the biochar residue, which tends to render the biochar basic. Addition of this basic biochar to a soil that is already basic is detrimental to the soil.

Soil pH can be managed in several ways. One way of managing soil pH is to add pH adjusting compounds directly to the soil before and/or after application of the fertilizer compositions. Another way of managing soil pH is to add pH adjusters directly to the fertilizer compositions. Many pH adjusters can be added to the fertilizer compositions, including neutralizers, acidifying agents, alkalizing agents, and/or buffering agents. In some embodiments, the pH adjuster may further comprise a dispersant.

pH adjusters useful for addition to acidic soil and/or fertilizer compositions can include, but not limited to, anions selected from the group of: bicarbonates, carbonates, hydroxides, amines, nitrates, halides, sulfonates, phosphates, and carboxylates. These compounds may comprise one or more functional groups within a polymer, as well as oxides such as calcium oxide and magnesium oxide, which produce basic compounds upon exposure to air. Additionally, the biochar may be made less alkaline by adding a bacterial compost tea (vide infra) containing acidic ingredients such as molasses, plant juice, or algal extractives.

pH adjusters useful for addition to alkaline soil and/or fertilizer can include, but are not limited to, inorganic acids such as HCl, $H_3PO_4$, and $H_2SO_4$, and organic acids such as humic, vanillic and ferulic acids. Additionally, the biochar may be made more alkaline by adding alkaline agents such as lime, bones, potassium carbonate or potassium hydroxide.

The fertilizer compositions can contain between about 0 wt. % and about 50 wt. % pH adjusters, preferably between about 0.1 wt. % and about 40 wt. %; more preferably between about 0.5 wt. % and about 30 wt. %; and most preferably between about 1 wt. % and about 20 wt. %.

Compositions

The fertilizer compositions can be any suitable form, including, but not limited to, granular, pellets, particulate, powder, and/or slurry. In some embodiments, the fertilizer compositions can be a form having controlled release properties. In preferred embodiments, the fertilizer compositions are in the form of pellets prepared by extrusion. In preferred embodiments, the fertilizer compositions are substantially free of synthetic materials. Exemplary fertilizer compositions are provided in Tables 1A-1B below.

TABLE 1A

|  | First Exemplary Range (wt. %) | Second Exemplary Range (wt. %) | Third Exemplary Range (wt. %) |
| --- | --- | --- | --- |
| Nutrient Carrier | 30-95 | 35-90 | 40-85 |
| Biodegradable Stabilizer | 10-65 | 15-50 | 20-45 |
| Additional Ingredients | 0-50 | 0-40 | 0-30 |

TABLE 1B

|  | First Exemplary Range (wt. %) | Second Exemplary Range (wt. %) | Third Exemplary Range (wt. %) |
| --- | --- | --- | --- |
| Nutrient Carrier |  |  |  |
| Soy-Based | 30-90 | 35-85 | 40-80 |
| Algae | 1-30 | 5-25 | 10-20 |
| Biodegradable Stabilizer | 10-65 | 15-50 | 20-45 |
| Additional Ingredients | 0-50 | 0-40 | 0-30 |

In an aspect of the invention, the fertilizer compositions have a desired amount of nutrients. Preferably, the fertilizer compositions have nitrogen, phosphorus, and potassium. The fertilizer compositions can have other nutrients as well.

The fertilizer compositions can have preferably at least about 3 wt. % nitrogen, more preferably at least about 4 wt. % nitrogen, and most preferably at least about 5 wt. % nitrogen.

The fertilizer compositions can have preferably at least about 1 wt. % phosphorus, more preferably at least about 2 wt. % phosphorus, and most preferably at least about 3 wt. % phosphorus.

The fertilizer compositions can have preferably at least about 0.5 wt. % potassium, more preferably at least about 1 wt. % potassium, and most preferably at least about 5 wt. % potassium.

Other formulations for the fertilizer compositions can be prepared according to the disclosure herein. These exemplary formulations are intended only to provide non-exhaustive examples of the fertilizer compositions. Additionally, the compositions can be prepared to optimize performance, costs, sustainability, and optimal rates of application.

Methods of Preparing the Compositions

The fertilizer compositions of the present invention can be prepared in many ways. Exemplary methods of preparing the fertilizer compositions include, but are not limited to, extrusion, molding, pelletizing, casting, and pressing. The compositions can be prepared by preparing the biorenewable nutrient carrier, then mixing the biorenewable nutrient carrier with the biodegradable stabilizer. Additional ingredients may be added simultaneously or subsequently and mixed. Once the desired composition is mixed the compositions can be prepared in the desired physical form.

Methods of Using the Compositions

The fertilizer compositions can be applied to a surface, including, but not limited to, soil, soilless plant growing medium, or any medium where a plant may be grown, such as lawns, flower beds, gardens, or containerized substrates, in any desired manner. An advantage of the fertilizer compositions is that they can be readily spread in traditional manners without the need to mix them with the soil or on a surface. However, the fertilizer compositions can also be applied in a manner where they are mixed with the surface. For example, the fertilizer composition can be mixed with soil. In another aspect of the invention, the fertilizer composition can be blended into a substrate for use in a soilless growth medium. The fertilizer compositions can be applied with agricultural machinery suitable for the particular environment. Exemplary machinery includes, but is not limited to, manure or fertilizer spreaders; plowing equipment, such as rotary hoes, disc harrows, chisels, et cetera; banding methods. In another aspect, the fertilizer compositions may be mixed with manure, compost or lime, or mixed with water or liquid manure and applied as a slurry. It can also be mixed with topsoil or simply spread on top of a surface such as a lawn, agriculture field, flower bed, garden, or containerized substrate.

EXAMPLES

Example 1: Nutrient Analysis

Fifteen exemplary fertilizer compositions were prepared with a biodegradable nutrient carrier and one or more stabilizers. The soy-based nutrient carriers were either soy polymer with adipic acid plasticizer (SPA) or soy flour (SF). Two types of commercially available polylactic acid (PLA) were used, 3001 PLA and 2003 PLA both obtained from NatureWorks, LLC. Each of the fifteen exemplary fertilizer compositions was analyzed for nitrogen, phosphorus, and potassium. Nitrogen content was assessed according to AOAC 993.13 standardized method for total nitrogen content by weight percent of the fertilizer compositions. Phosphorus and Potassium content were assessed according to the Manure Analysis A3769 method for $P_2O_5$ and $K_2O$ content by weight percent of the fertilizer compositions. The compositions and their nutrient profiles are provided in Table 2.

Table 2 shows that the soy-based nutrient carriers provided good nitrogen content and the algae provided good phosphorus content.

TABLE 2

|  | Nutrient Carrier |  | Stabilizer |  | Nitrogen | Phosphorus | Potassium |
| --- | --- | --- | --- | --- | --- | --- | --- |
| 1 | SPA | 50% | 3001 PLA | 50% | 3.21% | 0.68% | 1.05% |
| 2 | SPA | 60% | 3001 PLA | 40% | 3.82% | 0.88% | 1.31% |
| 3 | SPA | 70% | 3001 PLA | 30% | 4.89% | 1.03% | 1.56% |
| 4 | SPA | 50% | 3001 PLA PEG | 47.5% 2.5% | 3.36% | 0.71% | 1.09% |
| 5 | SPA | 60% | 3001 PLA PEG | 47.5% 2.5% | 3.87% | 0.91% | 1.37% |
| 6 | SPA | 70% | 3001 PLA PEG | 28.5% 1.5% | 5.22% | 1.07% | 1.70% |
| 7 | SPA | 50% | 3001 PLA PEG | 45% 5% | 3.99% | 0.83% | 1.27% |
| 8 | SPA | 60% | 3001 PLA PEG | 36% 4% | 4.28% | 0.91% | 1.39% |
| 9 | SPA | 70% | 3001 PLA PEG | 27% 3% | 5.19% | 1.10% | 1.71% |
| 10 | SPA | 50% | 2003 PLA | 50% | 3.33% | 0.75% | 1.13% |
| 11 | SPA | 60% | 2003 PLA | 40% | 4.11% | 0.78% | 1.23% |
| 12 | SF | 40% | 2003 PLA | 60% | 3.00% | 0.73% | 1.14% |
| 13 | SF | 50% | 2003 PLA | 50% | 4.01% | 0.93% | 1.45% |
| 14 | SF | 60% | 2003 PLA | 40% | 4.49% | 1.09% | 1.74% |
| 15 | Algae | 50% | 2003 PLA | 50% | 1.76% | 4.34% | 0.55% |

Example 2: Marigold Study

Two different slow-release fertilizer compositions were prepared according to Table 3 in pelletized form through an extrusion process. The soy used was a soy polymer plasticized with adipic anhydride. Six-inch pots were prepared and marigolds were planted in them. Four grams, eight grams, and sixteen grams of the fertilizer composition were added to different pots. Two control treatments for each composition were also prepared, one that was watered only and one that was treated with a commercial slow release fertilizer ("SRF").

TABLE 3

|  | Soy | PLA (Comp. A) PHA (Comp. B) | Biochar |
|---|---|---|---|
| Composition A | 37.5 wt. % | 37.5 wt. % | 25 wt. % |
| Composition B | 37.5 wt. % | 37.5 wt. % | 25 wt. % |

Figure 2:
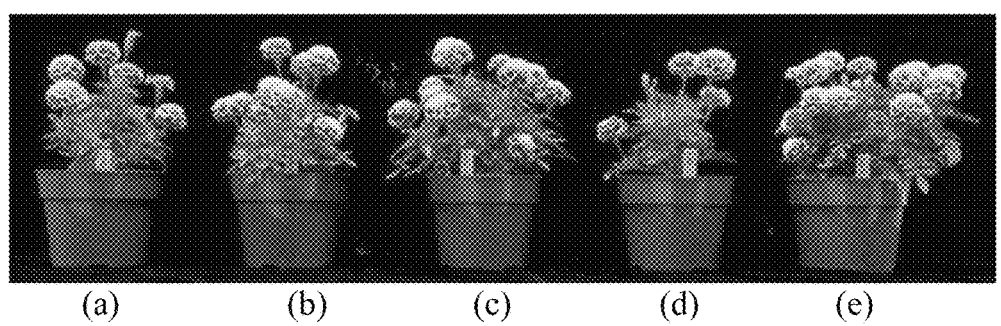
FIG. 2 shows photographs of marigolds in six-inch pots after being fertilized and/or watered. All of the marigolds were watered. The marigolds in (a) through (c) were fertilized with an exemplary fertilizer of the invention containing a soy-based polymer, PHA, and biochar. Four grams of the fertilizer were added to the pot in (a); eight grams of the fertilizer were added to the pot in (b), and sixteen grams of fertilizer were added to the marigold pot in (c). The pot in (d) was only watered and no fertilizer was added. A commercially available synthetic fertilizer was used in pot (e).

Performance of the different compositions was studied and can be viewed in FIGS. 1 and 2. FIG. 1 shows the comparison of Composition A in the varying amounts and as compared with the controls. FIG. 2 shows the comparison of Composition B in the varying amounts and as compared with the controls.

It was determined after the trial that the highest rate of treatment with soy-biochar (16 g/pot) contained one-third the concentration of nitrogen that was applied in the commercial fertilizer. In second-round trials, we adjusted the nitrogen contents to evaluate the soy-biochar SRF at the same N rates as the commercial product.

Example 3: Turfgrass Growth Comparison

A study was also performed with turfgrass, testing pelletized fertilizer compositions defined in Table 4 against two commercially available bio-based fertilizers, corn gluten meal and Milorganite®, and another treatment with no fertilizer. An area of turf grass was separated into five foot by five foot squares. Fertilizer treatments of the four types were applied at equal rates of nitrogen (N)—two pounds N per 1000 square feet.

TABLE 4

|  | PHA | Soy Polymer Plasticized with Adipic Anhydride | Biochar |
|---|---|---|---|
| Composition C | 22.5 wt. % | 62.5 wt. % | 15 wt. % |

|  | PLA | Soy Polymer Plasticized with Adipic Anhydride | Biochar |
|---|---|---|---|
| Composition D | 42.5 wt. % | 42.5 wt. % | 15 wt. % |

Both soy-biochar fertilizer compositions pellets perform better after five weeks than the two bio-based fertilizers that are commercially available and better than the water-only control. The PLA-Soy-Biochar fertilized turf was the greenest and healthiest after five weeks, followed by the PHA-Soy-Biochar.

Example 4: Fertilizer Composition Greenhouse Comparison

Four formulations of plant protein and biochar fertilizers were prepared as set forth in Table 5. The compositions included a positive control that was a synthetic slow release fertilizer (Nutricote®), and a negative control with no fertilizer.

TABLE 5

|  | N (%) | P (%) | K (%) |
|---|---|---|---|
| 1. PLA-Soy-Biochar (42.5/42.5/15) | 3.33 | 0.23 | 0.57 |
| 2. PHA-Soy-Biochar (22.5/62.5/15) | 5.01 | 0.34 | 0.80 |
| 3. PLA-Soy-Biochar (37.5/37.5/25) | 2.85 | 0.20 | 0.49 |
| 4. PHA-Soy-Biochar (37.5/37.5/25) | 3.08 | 0.21 | 0.48 |

Figure 3:
FIG. 3 shows photographs of marigold plants grown for 7 weeks after treatment with soy-biochar fertilizers of the invention (a) and (b), a commercial synthetic fertilizer (c), or no fertilizer (d).

The fertilizers were evaluated in a greenhouse trial growing marigolds with all fertilizers applied at equal rates of nitrogen (N at 1.44 grams per plant container). Numerical results for plant dry weights, plant quality index, and concentration of nitrogen (N) lost in leachate are shown in Table 6, and visual results of fertilizer effects of soy-biochar fertilizers #3 and #4 on marigolds, as well as the positive and negative controls (left to right, respectively), are illustrated in FIG. 3.

TABLE 6

| Fertilizer type | Plant dry weight (g) | Plant quality index | Concentration of N lost in leachate (mg/L) |
|---|---|---|---|
| 1. PLA-Soy-Biochar (42.5/42.5/15) | 21.4 | 201 | 2.08 |
| 2. PHA-Soy-Biochar (22.5/62.5/15) | 22.7 | 146 | 1.86 |
| 3. PLA-Soy-Biochar (37.5/37.5/25) | 26.4 | 212 | 1.63 |
| 4. PHA-Soy-Biochar (37.5/37.5/25) | 25.1 | 179 | 1.68 |
| Nutricote ® slow-release fertilizer | 29.5 | 197 | 2.49 |
| No fertilizer (Control) | 3.0 | 2 | 1.12 |

The results in Table 6 are after 7 weeks growing marigolds with bio-based fertilizers and a synthetic slow-release fertilizer applied at an equal rate of nitrogen (1.44 g N per container) in one application during transplanting of plugs into 6" standard containers. The plant quality index is a combined measurement that includes shoot size and health rating.

Results show that all four of the soy-biochar fertilizers evaluated provided beneficial levels of plant nutrients for healthy plant growth. All four soy-biochar fertilizer formulations provided nutrients for plant growth similar to that seen for the synthetic fertilizer treatment, but with less nitrogen (N) lost in leachate. In this trial, soy-biochar formulations #3 (shown in FIG. 3(a)) and #4 (shown in FIG. 3(b)) performed better than #1 and #2 (not depicted in the Figures), but further evaluations will be performed to determine proper rates of application of each formulation for optimal plant growth and health.

The above specification provides a description of the manufacture and use of the disclosed compositions and methods. Since many embodiments can be made without departing from the spirit and scope of the invention, the invention resides in the claims.

What is claimed is:
1. A fertilizer composition comprising:
   a biorenewable nutrient carrier, wherein the biorenewable nutrient carrier comprises a soy-based carrier, wherein the soy-based carrier is a soy polymer, soy protein, and/or soy flour, and wherein the soy-based carrier is plasticized; and
   a biodegradable stabilizer capable of controlled release of nutrients, wherein the biodegradable stabilizer comprises waxes, adipic anhydride, polylactic acid, polyhydroxyalkanoate, polyurethane, polyethylene glycol, polyamide, and/or combinations thereof;

wherein the biorenewable nutrient carrier and the biodegradable stabilizer are mixed.

2. The composition of claim 1, wherein the biorenewable nutrient carrier further comprises a carbohydrate, a distiller grain, proteins, fibers, biopolymers, stover, and/or combinations thereof.

3. The composition of claim 1 further comprising an algae.

4. The composition of claim 1, wherein the composition comprises two or more biodegradable stabilizers.

5. The composition of claim 4, wherein one of the biodegradable stabilizers is polyethylene glycol.

6. The composition of claim 1, wherein the biodegradable stabilizer is present in the composition from about 10 wt. % to about 65 wt. %; and wherein the nutrient carrier is present in an amount from about 30 wt. % to about 90 wt. %.

7. The composition of claim 1 wherein the fertilizer has a nitrogen content of at least about 3 wt. %.

8. The composition of claim 1 further comprising one or more of the following: biochar, an additional fertilizer, a microorganism, an additional nutrient, or a pH adjuster.

9. The composition of claim 1 wherein the composition is extruded, cast, or pressed.

10. The composition of claim 1 wherein the composition is pelletized.

11. A method of fertilizing a plant comprising:
 (a) providing the fertilizer composition of claim 1; and
 (b) applying the fertilizer composition to a medium where a plant may be grown.

12. The method of claim 11 wherein the nutrient carrier further comprising an algae.

13. The method of claim 11 wherein the medium is a soil or soilless plant growing medium.

14. A method of manufacturing the fertilizer composition of claim 1 comprising:
 mixing the biorenewable nutrient carrier and the biodegradable stabilizer capable of controlled release of nutrients
 wherein the biorenewable nutrient carrier and the biodegradable stabilizer are mixed to form a fertilizer composition and
 wherein the fertilizer composition is cast, pressed, or extruded.

15. The method of claim 14, wherein the nutrient carrier is present in the composition from about 30 wt. % to about 90 wt. % and wherein the biodegradable stabilizer is present in an amount from about 10 wt. % to about 65 wt. %.

* * * * *